United States Patent [19]

Lambitz et al.

[11] 4,047,749

[45] Sept. 13, 1977

[54] CARGO BOX LINER FOR PICK-UP TRUCKS

[75] Inventors: Robert H. Lambitz; Robert J. Zeffero, both of Fenton, Mich.

[73] Assignee: Zefflamb Industries, Inc., Fenton, Mich.

[21] Appl. No.: 699,309

[22] Filed: June 23, 1976

[51] Int. Cl.² .............................................. B62D 33/00
[52] U.S. Cl. .................................. 296/39 R; 105/468
[58] Field of Search ................ 296/39 R, 39 A, 31 P, 296/28 D; 105/468; 224/42.42 R

[56] References Cited

U.S. PATENT DOCUMENTS

| 2,791,463 | 5/1957 | Levitt | 296/39 R X |
| 3,163,463 | 12/1964 | Femrite | 296/28 D |
| 3,653,710 | 4/1972 | Barnard | 105/468 X |
| 3,881,768 | 5/1975 | Nix | 296/39 R |

FOREIGN PATENT DOCUMENTS

| 862,378 | 3/1961 | United Kingdom | 296/39 R |

*Primary Examiner*—Philip Goodman
*Attorney, Agent, or Firm*—Charles W. Chandler

[57] ABSTRACT

A cargo box liner for a pick-up truck formed of a molded polyethylene plastic. The liner has a unitary body for the cargo box and a separate panel on the tailgate. The vertical walls of the liner have elongated vertical ribs to compensate for the tendency of polyethylene to become wavy when exposed to sunlight.

8 Claims, 5 Drawing Figures

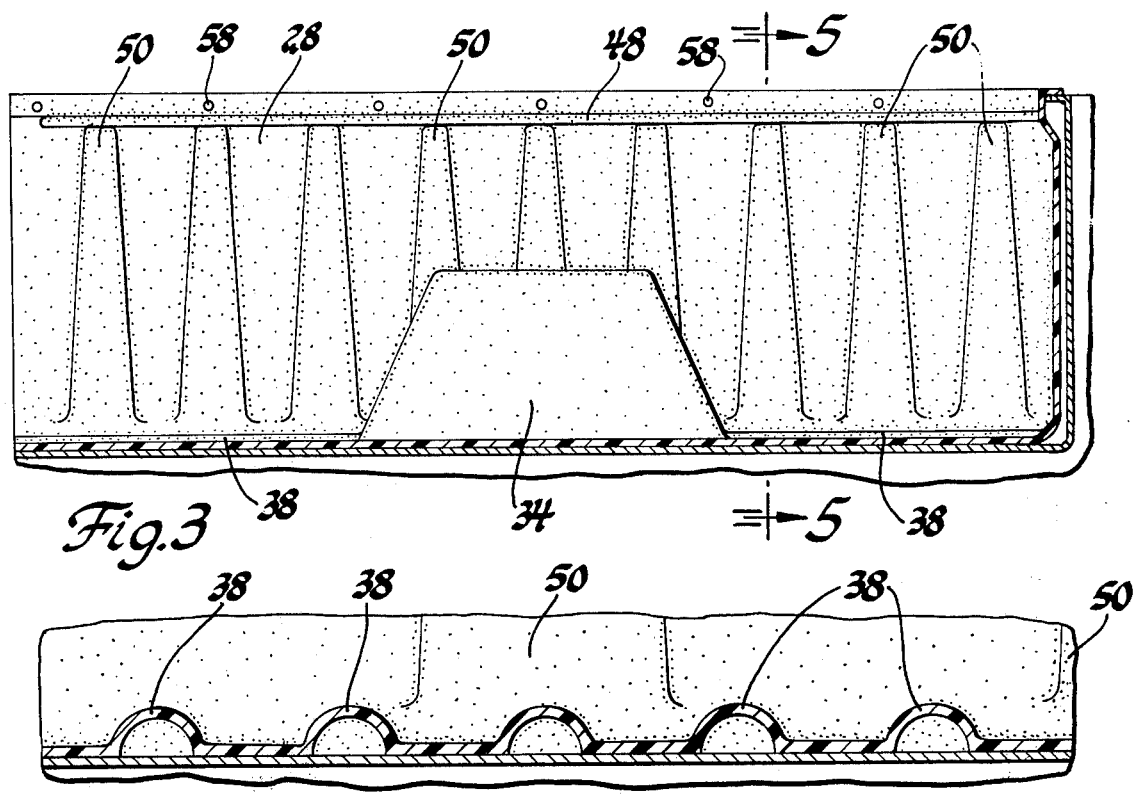
Fig.3
Fig.4
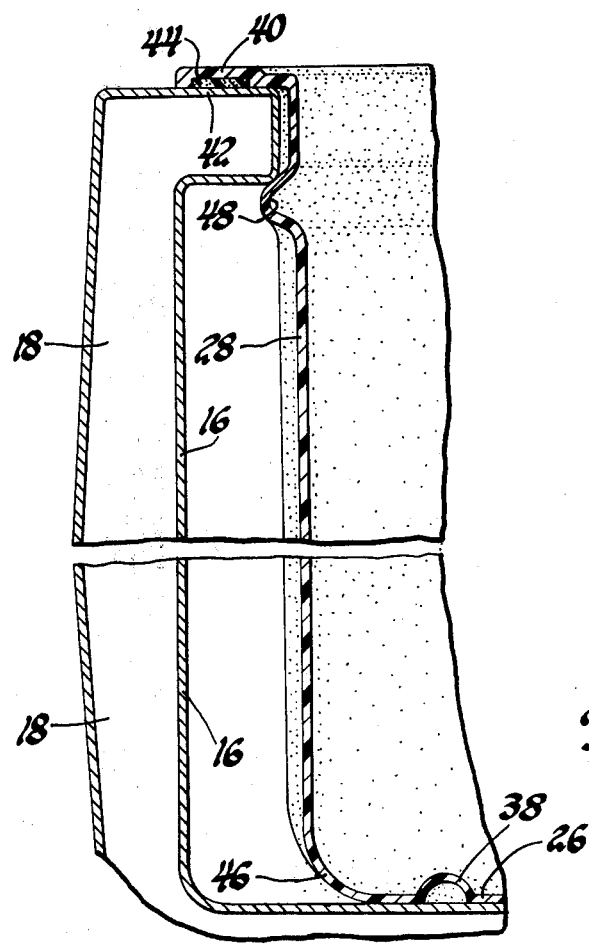
Fig.5

CARGO BOX LINER FOR PICK-UP TRUCKS

BACKGROUND OF THE INVENTION

This invention is related to a liner for the cargo box of a pick-up truck and more particularly to a unitary plastic molded liner having sidewalls formed to compensate for the variances in the height of the cargo box sidewalls, and to compensate for the tendency of thin walled polyethylene structure to expand and contract in response to heat.

Although liners for pick-up trucks are well known in the prior art for protecting the inner surfaces of the cargo box, such liners have received limited commercial acceptance. One commercial form of such a liner has been made of fiberglass which is not only expensive to fabricate, but adds considerable weight to the pick-up truck. Another prior art liner has been molded of polyethylene into a thin walled plastic structure that is impact and scratch resistant, corrosion resistant as well as being both tough and durable, however, such a product is sensitive to heat so that when exposed to sunlight it expands and assumes a wavy appearance. This detracts from both the appearance and fit of the liner in the cargo box.

SUMMARY OF THE INVENTION

The broad purpose of the present invention is to provide a cargo box liner formed of a thin walled molded plastic material in which the vertical walls of the liner have a plurality of vertical parallel ribs to compensate for the expansion characteristics of the plastic and thereby prevent the vertical liner walls from separating from the sidewalls of the cargo box.

Another object of the invention is to provide a horizontal flange along each sidewall which is seated along the top edge of the cargo box and which cooperates with a horizontal rib to permit the height of the top flange to be adjusted to compensate for variances in the cargo box height between similar pick-up trucks.

Still further objects of the invention will become readily apparent to those skilled in the art upon reference to the following detailed description.

DESCRIPTION OF THE DRAWINGS

The description refers to the accompanying drawings in which like parts throughout the several views, and in which:

FIG. 3 is a view of one of the liner sidewalls;

FIG. 4 is an enlarged view of a portion of the bottom wall of the liner as seen along lines 4—4 of FIG. 2; and FIG. 5 is an enlarged view taken along lines 5—5 of FIG. 3.

DESCRIPTION OF THE PREFERRED EMBODIMENT

Figure 1:
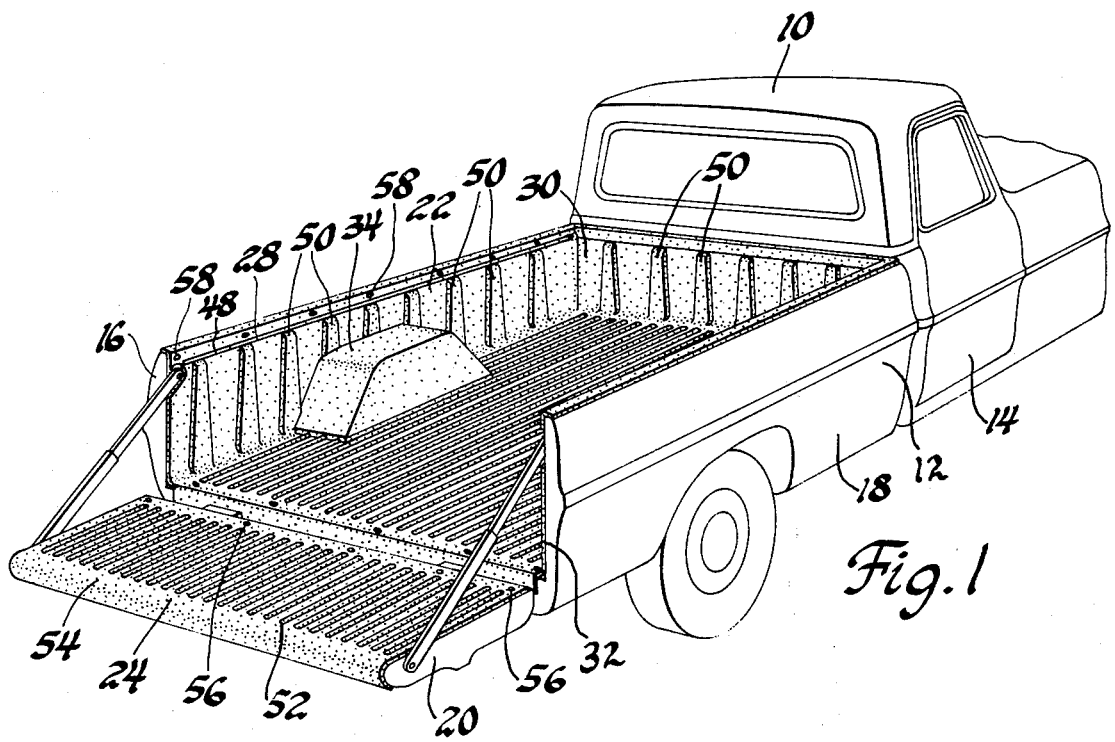
FIG. 1 is a fragmentary perspective view of a pick-up truck illustrating the preferred liner mounted in the cargo box and on the tailgate.

Referring to the drawing, FIG. 1 illustrates a conventional pick-up truck 10 having a cargo box 12 and a cab 14. Cargo box 12 includes a sidewall 16 and a sidewall 18. The rear ends of sidewalls 16 and 18 define an opening which is closed by a tailgate 20 in a manner well known to those skilled in the art. A cargo box liner 22 is mounted in cargo box 12, and a panel 24 is mounted on tailgate 20.

Figure 2:
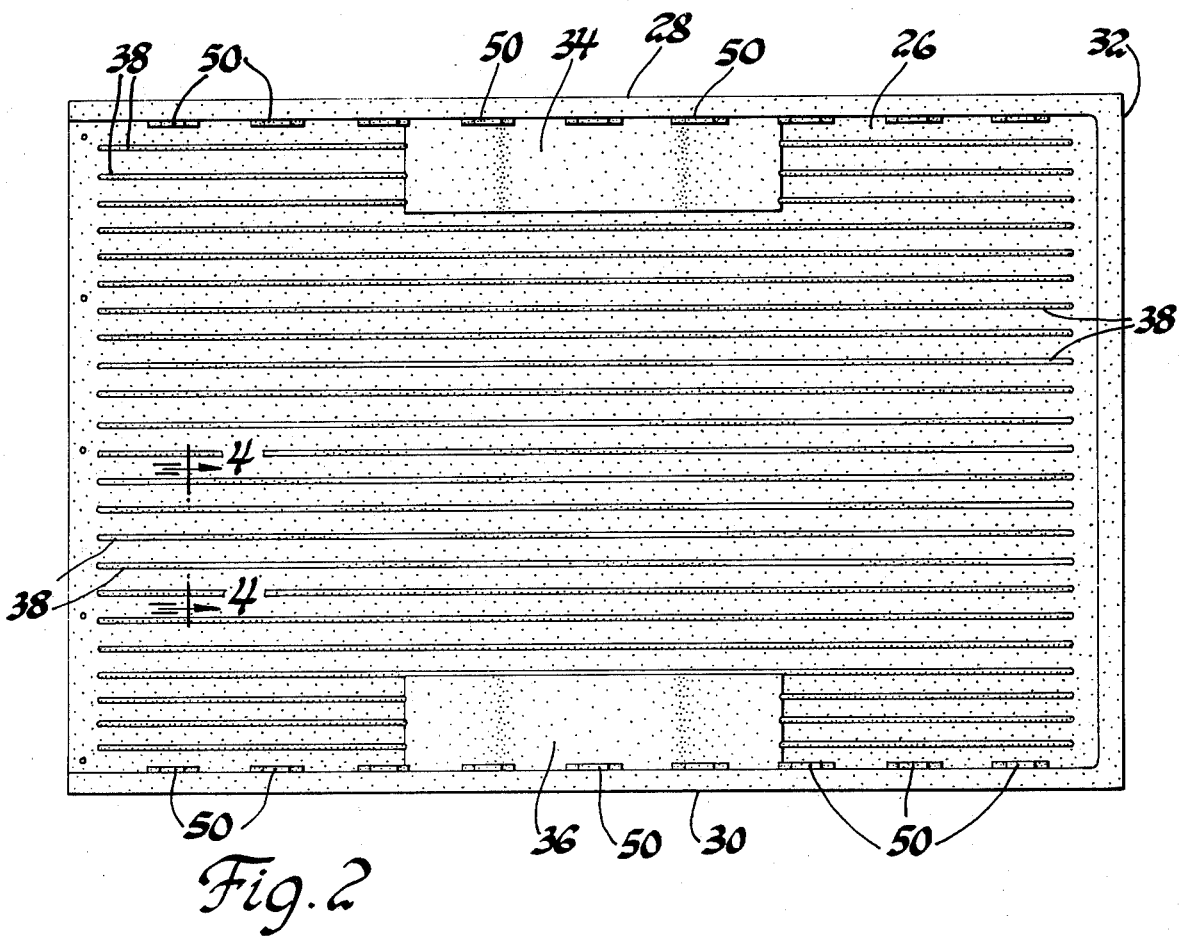
FIG. 2 is a plan view of the preferred cargo box liner.

Referring to FIG. 2, liner 22 comprises a unitary member, preferably formed of a polyethylene plastic and has a bottom wall 26 seated on the base of cargo box 12. A sidewall 28 is integrally connected to the forward end of bottom wall 26 as well as to sidewalls 28 and 30. Sidewall 28 has a well 34 accomodating th wheel well on one side of the pick-up truck, and sidewall 30 has a well 36 for receiving the wheel well on the opposite side of the pick-up truck.

Referring to FIGS. 2 and 4, bottom wall 26 is formed with a plurality of elongated ribs 38 which are parallel to sidewalls 28 and 30 and at right angles to the raised position of tailgate 20. Ribs 38 are closely spaced together to permit heavy objects to be slid from the tailgate 20 toward the interior of the cargo box. In addition, ribs 38 minimize warpage of the bottom wall caused by exposure to sunlight.

Referring to FIGS. 3 and 5, sidewall 28 has a top flange 40 seated on cargo box flange 42. Preferably a tape 44 having a sticky surface on both its upper and lower sides is disposed along flange 42 in contact with liner flange 40.

Sidewall 28 is connected to bottom wall 26 by a corner 46 having a relatively large curvature, such as a two and a half inch radius, which permits liner 22 to be readily and easily fitted to cargo boxes having variances both in their height as well as in their width. A horizontal rib 48, about two inches below flange 40, also cooperates with corner 46 so that the overall height of the liner can be adjusted according to the height of the cargo box.

Sidewall 28, forward wall 30, and sidewall 32 each have a plurality of vertical ribs 50 each of which extends from the horizontal rib 48 to bottom corner 46. Each rib 50 has a slight taper so that its base is larger than the end adjacent rib 48. The ribs are preferably symmetric about their center line and have a taper of 5° on each side. Preferably the base of each rib has a width of 4½ inches and a distance of approximately 9¾ inches between the longitudinal axis of each rib. Each rib has the same thickness as the body of the sidewall since the entire liner is formed from a panel having a uniform thickness. Each rib 50 is offset from the plane of its respective panels to minimize the warpage caused by the sensitivity of the side and forward panels to heat so that the liner always maintains a uniform fit throughout the cargo box.

Referring to FIG. 1, panel 24 has a plurality of closely spaced relatively narrow ribs 52 similar to ribs 38 so that when the tailgate is in its lowered position, a part can be easily slid into the cargo box over the tailgate. Panel 24 has a flange 54 which fits over the top of tailgate 20. A plurality of self-tapping screws 56 connect the bottom half of the panel to the tailgate. Similarly, a plurality of self-tapping screws 58 attaches the upper edge of liner 22 to the cargo box.

The preferred liner is preferably formed of a thin-walled plastic which is tough, long wearing, lightweight, and can be easily molded from a high density polyethylene. Because of its light weight, it can be quickly and easily installed by a plurality of self-tapping metal screws.

Having described my invention, we claim:

1. In combination with a pick-up truck having a cargo box, said box having sidewalls, hollow flanges extending inwardly from the sidewalls and a bottom wall, a cargo box liner comprising:

a molded, plastic, unitary liner body having walls of a substantially uniform thickness including a bottom wall, a forward wall integrally connected to the bottom wall, a pair of spaced sidewalls on opposite sides of the bottom wall, a pair of flexible corners each formed with a radius several times the liner thickness, each corner forming a connection between the bottom wall and the corresponding sidewall, the liner sidewalls forming a rearward opening for receiving an object to a position between the liner sidewalls, integral, outwardly extending flange means connected to the top of the liner sidewalls and seated on the hollow cargo box flanges in a position in which a major portion of the height of each liner sidewall is spaced inwardly from its respective cargo box sidewall so as to be movable with respect to such cargo box sidewall, each liner sidewall having a plurality of elongated, parallel, vertical ribs, each rib having an upper end supported adjacent the hollow flange of the cargo box and a lower end terminating adjacent the liner corner at the bottom of the sidewall, the ribs being formed such that the lower end of each rib is movable in response to a downward motion applied to the upper end of the rib whereby the corner at the bottom of the sidewall assumes a position permitting the vertical distance between the liner flange means and the liner bottom wall to accomodate the distance between the top of the cargo box flanges and the cargo box bottom wall.

2. A liner as defined in claim 1, in which the cargo box has a depending tailgate, and including a plastic tailgate panel mounted on the tailgate, said tailgate panel having a plurality of parallel ribs.

3. In combination with a pick-up truck having a cargo box, said box having sidewalls, hollow flanges extending inwardly from the sidewalls, a bottom wall, and a pair of wheel wells, a cargo box liner comprising:

a unitary liner body molded of polyethylene plastic having walls of a substantially uniform thickness including a bottom wall having a plurality of parallel ribs, a forward wall integrally connected to the bottom wall, a pair of spaced sidewalls on opposite sides of the bottom wall, a pair of flexible corners each formed with a radius several times the liner thickness, each corner forming a connection between the bottom wall and the corresponding sidewall, the liner sidewalls forming a rearward opening for receiving an object to a position between the liner sidewalls, integral, outwardly extending flange means connected to the top of the liner sidewalls and seated on the hollow cargo box flanges in a position in which a major portion of the height of each liner sidewall is spaced inwardly from its respective cargo box sidewall so as to be movable with respect to such cargo box sidewall, each liner sidewall having a wheel well for receiving the wheel well of the pick-up truck and a plurality of elongated parallel, vertical ribs, each rib being tapered such that its upper end is narrower than its lower end, the upper end of each rib being supported adjacent the hollow flanges of the cargo box and the lower end of each rib terminating adjacent the liner corners at the bottom of the sidewall, the ribs being formed such that the lower end of each rib is movable in response to a downward motion applied to the upper end of the rib whereby the corner at the bottom of the sidewall assumes a position permitting the vertical distance between the liner flange means and the liner bottom wall to accomodate the distance between the top of the cargo box flanges and the cargo box bottom wall, and a tailgate panel having a plurality of parallel ribs.

4. A liner as defined in claim 1, in which each liner sidewall has a wheel well for receiving the wheel well of the pick-up truck.

5. A liner as defined in claim 1, in which the bottom wall has a plurality of parallel ribs disposed between the liner sidewalls.

6. A liner as defined in claim 1, in which the tailgate has a plurality of parallel ribs.

7. A liner as defined in claim 1, in which each of said parallel ribs is tapered such that its upper end is narrower than its lower end.

8. A liner as defined in claim 1, in which the liner is formed of a molded polyethylene plastic.

* * * * *